United States Patent
Xu et al.

(10) Patent No.: US 7,039,634 B2
(45) Date of Patent: May 2, 2006

(54) SEMANTIC QUERYING A PEER-TO-PEER NETWORK

(75) Inventors: Zhichen Xu, Sunnyvale, CA (US); Mallik Mahalingam, Sunnyvale, CA (US); Chunqiang Tang, Rochester, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 455 days.

(21) Appl. No.: 10/385,454

(22) Filed: Mar. 12, 2003

(65) Prior Publication Data

US 2004/0181511 A1 Sep. 16, 2004

(51) Int. Cl.
*G06F 17/30* (2006.01)
*G06F 7/00* (2006.01)

(52) U.S. Cl. .................................. 707/3; 707/4; 707/5
(58) Field of Classification Search ................ 707/100, 707/102, 3, 4, 5; 700/3, 4; 709/239, 243, 709/245; 370/389
See application file for complete search history.

(56) References Cited

U.S. PATENT DOCUMENTS

| | | | |
|---|---|---|---|
| 5,287,496 A | | 2/1994 | Chen et al. |
| 5,802,361 A | | 9/1998 | Wang et al. |
| 5,875,479 A | | 2/1999 | Blount et al. |
| 5,990,810 A | | 11/1999 | Williams |
| 6,269,431 B1 | | 7/2001 | Dunham |
| 6,295,529 B1 | | 9/2001 | Corston-Oliver et al. |
| 6,304,980 B1 | | 10/2001 | Beardsley et al. |
| 6,311,193 B1 | | 10/2001 | Sekido |
| 6,487,539 B1 | * | 11/2002 | Aggarwal et al. ............. 705/14 |
| 2002/0138511 A1 | | 9/2002 | Psounis et al. |
| 2002/0150093 A1 | * | 10/2002 | Ott et al. ..................... 370/389 |
| 2002/0156763 A1 | * | 10/2002 | Marchisio ....................... 707/1 |
| 2003/0004942 A1 | | 1/2003 | Bird |
| 2003/0074369 A1 | | 4/2003 | Schuetze et al. |
| 2003/0159007 A1 | | 8/2003 | Sawdon et al. |
| 2003/0163493 A1 | | 8/2003 | Burns et al. |
| 2003/0217047 A1 | * | 11/2003 | Marchisio ....................... 707/3 |
| 2004/0054807 A1 | * | 3/2004 | Harvey et al. ............... 709/243 |
| 2004/0088282 A1 | * | 5/2004 | Xu et al. ........................ 707/3 |
| 2004/0098377 A1 | * | 5/2004 | Kraft ............................... 707/3 |
| 2004/0098502 A1 | * | 5/2004 | Xu et al. ..................... 709/238 |
| 2004/0143666 A1 | * | 7/2004 | Xu et al. ..................... 709/227 |
| 2004/0177061 A1 | * | 9/2004 | Xu et al. ........................ 707/3 |
| 2004/0181607 A1 | * | 9/2004 | Xu et al. ..................... 709/239 |
| 2004/0205242 A1 | * | 10/2004 | Xu et al. ..................... 709/245 |
| 2005/0108203 A1 | * | 5/2005 | Tang et al. ..................... 707/3 |

OTHER PUBLICATIONS

Tang et al., "pSearch: Information Retrieval in Structured Overlays", ACM SIGCOMM Computer Communications Review, vol. 33, No. 1, Jan. 2003.*

(Continued)

*Primary Examiner*—Apu Mofiz
*Assistant Examiner*—Michael J Hicks
(74) *Attorney, Agent, or Firm*—Richard P. Lange

(57) ABSTRACT

In a method of semantic querying in a peer-to-peer network, an item of information is mapped into a semantic vector based on the latent semantic indexing algorithm or any IR algorithms that can derive a vector representation. The semantic vector is associated with an address index as a key pair. The key pair is stored in an overlay network formed from the peer-to-peer network such that the stored key pair is proximally located to at least one other key pair having a similar semantic vector.

31 Claims, 9 Drawing Sheets

OTHER PUBLICATIONS

Crespo et al., "Routing Indices For Peer-to-Peer Systems", Proceedings of the 22$^{nd}$ International Conference on Distributed Computing Systems IEEE, 2002.*

Cohen et al., "A Case for Associative Peer to Peer Overlays" ACM SIGCOMM Computer Communications Review, vol. 33, No. 1; Jan. 2003.*

Crespo et al., "Semantic Overlay Networks for P2P Systems", Google Technologies Inc., Stanford University.*

Berry, M. W. et al., "Matrices, Vector Spaces, and Information Retrieval", SIAM Review, 1999, vol. 41, No. 2, p. 335-362.

Deerwester, S. et al., "Indexing by Latent Semantic Analysis", downloaded Jul. 14, 2005.

Fu, K. et al., "Fast and Secure Distributed Read-Only File System", ACM Transactions on Computer Systems, Feb. 2002, vol. 20, No. 1.

Gifford, D. K. et al., "Semantic File Systems", 13th ACM Symposium on Operating Systems Principles, Oct. 1991.

Gopal, B. et al., "Integrating Content-Based Access Mechanisms with Hierarchical File Systems", USENIX, 3rd Symposium on OSDI, Feb. 1999.

Kubiatowicz, J. et al., "OceanStore: An Architecture for Global-Scale Persistent Storage", ASPLOS 2000.

Patterson, H. et al., "SnapMirror: File System Based Asynchronous Mirroring for Disaster Recovery", USENIX, Fast 2002 Conference on File and Storage Technologies, Jan. 2002.

Quinlan, S. et al., "Venti: A New Approach to Archival Storage", downloaded Jul. 14, 2005.

Ratnasamy, S. et al., "A Scalable Content-Addressable Network", ACM SIGCOMM '01, Aug. 2001.

Santry, D. S. et al., "Deciding When to Forget in the Elephant File System", 17th ACM Symposium on Operating Systems Principles, Dec. 1999, p. 110-123.

Tang, C. et al., "PeerSearch: Efficient Information Retrieval in Peer-to-Peer Networks", HP Labs Palo Alto, HPL-2002-198, Jul., 2002.

Weatherspoon, H. et al., "Erasure Coding vs. Replication: A Quantitative Comparison", downloaded Jul. 14, 2005.

Welsh, M. et al., "Querying Large Collection of Music for Similarity", downloaded Jul. 14, 2005.

* cited by examiner

SEMANTIC QUERYING A PEER-TO-PEER NETWORK

FIELD

This invention relates generally to network systems. More particularly, the invention relates to querying in a network.

DESCRIPTION OF THE RELATED ART

Generally, the quantity of information that exists on the Internet is beyond the capability of typical centralized search engines to efficiently search. One study estimated that the deep Web may contain 550 billion documents, which is far greater than the 1.2 billion pages that Google identified. Moreover, the rate that information continues to grow is typically doubling each year.

Peer-to-peer (P2P) systems have been proposed as a solution to the problems associated with conventional centralized search engines. P2P systems offer advantages such as scalability, fault tolerance, and self-organization. These advantages spur an interest in building a decentralized information retrieval (IR) system based on P2P systems.

However, current P2P searching systems may also have disadvantages and drawbacks. For instance, P2P searching systems are typically unscalable or unable to provide deterministic performance guarantees. More specifically, the current P2P searching systems are substantially based on centralized indexing, query flooding, index flooding or heuristics. As such, centralized indexing systems, such as Napster, suffer from a single point of failure and performance bottleneck at the index server. Flooding-based techniques, such as Gnutella, send a query or index to every node in the P2P system, and thus, consuming large amounts of network bandwidth and CPU cycles. Heuristics-based techniques try to improve performance by directing searches to only a fraction of the population but may fail to retrieve relevant documents.

One class of P2P systems, the distributed hash table (DHT) systems (e.g., content addressable network (CAN)) provide an improved scalability over the other P2P systems. However, DHT systems are not without disadvantages and drawbacks. Since they offer a relatively simple interface for storing and retrieving information, DHT systems are not suitable for full-text searching.

Moreover, besides the performance inefficiencies, a common problem with typical P2P systems is that they do not incorporate advanced searching and ranking algorithms devised by the IR community. Accordingly, the P2P systems typically rely on simple keyword based searching.

SUMMARY

One embodiment pertains to a method of semantic querying of a peer-to-peer network. The method includes mapping an item of information into a semantic vector based on a latent semantic indexing algorithm and associating the semantic vector with an address index as a key pair. The method also includes storing the key pair in an overlay network formed from the peer-to-peer network such that the stored key pair is proximally located to at least one other key pair having a similar semantic vector.

Another embodiment relates to an apparatus for semantic querying in a peer-to-peer network. The apparatus includes means for creating a plurality of indices. Each index of the plurality of indices comprises a plurality of key pairs. Each key pair comprises a respective semantic vector and an associated address index. The apparatus also includes means for associating a selected index of the plurality to a selected peer based on a location of where the respective semantic vectors of the key pairs of the selected index falls within an overlay network.

Yet another embodiment pertains to a system for querying a peer-to-peer network. The system includes a plurality of peers and an overlay network implemented by the plurality of peers. The overlay network is configured to be divided into zones where each zone owned by a respective peer of the plurality of peers. The system also includes a plurality of indices where each index of the plurality of indices based on at least one key pair comprising of a respective parameter vector and associated address index. The parameter vector is based on a transformation of a respective semantic vector. The system further includes a query module stored an executed by each peer of the plurality of peers. The query module is configured to convert a query into a query parameter vector and to receive requested information from a respective index stored a selected peer that owns the respective zone where the query parameter vector falls within the overlay network.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
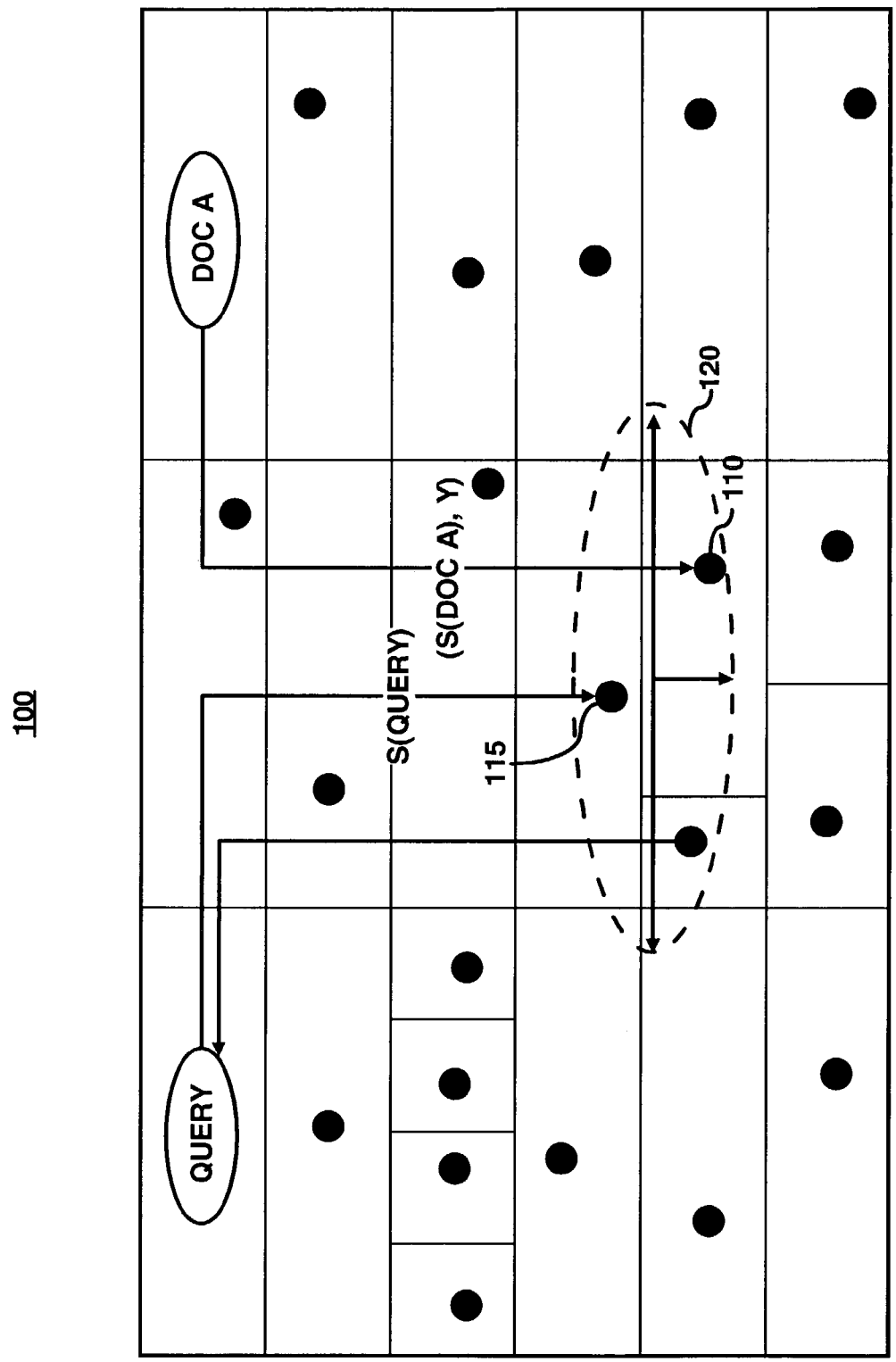
FIG. 1 illustrates a representation of an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with an embodiment, a system for the controlled placement of documents is provided in order to facilitate searching for information (e.g., documents, data, etc.). In particular, a subset of the peers (or nodes) of a peer-to-peer (P2P) network implement a peer search network, a controlled-placement overlay network, i.e., a peer search network, over the P2P network. A logical space formed by the peer search network may be a d-torus, where d is the dimension of the logical space. The logical space is divided into fundamental (or basic) zones where each node of the subset is the peers is an owner. Additional zones are formed over the fundamental zones.

In the peer search network, information (e.g., documents, web pages, music files, data, etc.) may be represented by a key pair comprising of a semantic vector and an address index (e.g., the information itself, a universal resource locator, a network address, etc.). The semantic vector, S, may be a semantic information space representation of a selected item of information. The semantic vector may be determined by applying the latent-semantic indexing (LSI) algorithm or any IR algorithms that can derive a vector representation of documents. Many of the embodiments described herein reference vector representations of documents stored in the peer-to-peer network. It will be apparent to one of ordinary skill in the art that vector representations of other types of data (e.g., music files, web pages, etc.) may be generated or used in the embodiments described herein and stored in the peer-to-peer network.

LSI uses statistically derived conceptual indices instead of individual terms for retrieval. LSI may use known singular value decomposition (SVD) algorithms to transform a high-dimensional term vector (i.e., a vector having a large number of terms which may be generated using known vector space modeling algorithms) into a lower-dimensional semantic vector by projecting the high-dimension vector into a semantic subspace. For example, a document or information regarding the document is to be stored in the peer-to-peer network. A semantic vector is generated for the document. Each element of the semantic vector corresponds to the importance of an abstract concept in the document or query instead of a term in the document. Also, SVD sorts elements in semantic vectors by decreasing importance. Thus, for an SVD-generated semantic vector vi=v0, v1, v2, v3, the "lower elements" (e.g., v0 and v1) represent concepts that are more likely to identify relevant documents or other information in response to a query. The lower elements, for example, have higher hit rates.

The following describes generation of a semantic vector. Let d denote the number of documents in a corpus, and t denote the number of terms in a vocabulary. Vector space modeling algorithms may be used to represent this corpus as a t×d matrix A, whose entry aij indicates the importance of term i in document j. Suppose the rank of A is r. SVD decomposes A into the product of three matrices, $A=U\Sigma V^T$, where $\Sigma=\text{diag}(\delta 1; \ldots ; \delta r)$ is an r×r diagonal matrix, $U=(u1; \ldots ; ur)$ is a t×r matrix, and $V=(v1; \ldots ; vr)$ is a d×r matrix. $\delta i$ are A's singular values, $\delta 1 \geq \delta 2 \geq \ldots \geq \delta r$.

LSI approximates the matrix A of rank r with a matrix A1 of lower rank 1 by omitting all but the 1 largest singular values. Let $\Sigma z=\text{diag}(\delta 1; \ldots ; \delta z)$, $U1=(u1; \ldots ; uz)$, and $V1=(v1; \ldots ; vz)$. Thus the matrix Az is calculated using the following equation: $Az=Uz\Sigma zVz^T$ Among all matrices of rank z, Az approximates A with the smallest error. The rows of $Vz\Sigma z$ are the semantic vectors for documents in the corpus. Given Uz, Vz, and $\Sigma z$, the semantic vectors of queries, terms, or documents originally not in A can be generated by folding them into the semantic subspace of a lower rank. By choosing an appropriate z for Az, the important structure of the corpus is retained while noise is minimized. In addition, LSI can bring together documents that are semantically related even if they do not share terms. For instance, a query or search using "car" may return relevant documents that actually use "automobile" in the text.

The semantic vector also indicates a location in the peer search network. As described above, information in the peer search network may be represented by a key pair comprising a semantic vector and an address index. The semantic vector is hashed to identify a point (or node) in the overlay network for storing the key pair. The key pair is then routed to a node owner of a zone of where the semantic vector falls in the peer search network. That is the key pair is routed to the node owner of the zone of where the identified point falls in the overlay network. Indices including key pairs may then be formed at a node or around nearby neighboring nodes. These indices may be searched in response to a query.

By using a semantic vector to derive a location in the peer search network for storing a key pair, key pairs having similar information are stored in close proximity (e.g., within a limited number of routing hops). Therefore, instead of flooding a query to an entire peer-to-peer network, a limited number of nodes in close proximity in the peer search network may be searched to determine the results of a query.

When a query is received, an LSI algorithm may be applied to the query to form a semantic query vector, S. The semantic query vector is then routed in the peer search network to the node owner of the zone where the semantic query vector falls in the peer search network. The destination node may flood the query to surrounding nodes within a radius, r. The radius, r, may be based on a similarity threshold, a number of requested documents, or other similar metric. Each of nodes may retrieve the best-matching information based on LSI algorithms and return the information to the query initiator. The query initiator may filter or rank the retrieved information (i.e., the candidate information) globally and provide the filtered retrieved information to a user, which may be illustrated with respect to FIG. 1.

In another embodiment, a parameter vector may be utilized by the peer search network to ameliorate unbalanced loads in the peer search network. More particularly, the semantic vector, S, may be transformed into the parameter vector, P, in the (l-1) dimensional polar subspace. The transformation of the semantic vector, S, to parameter vector, P, may be given by equation (1):

$$\theta_j = \arctan\left(\frac{s_{j+1}}{\sqrt{\sum_{i=1}^{j} s_i^2}}\right), j = 1, \ldots, l-1 \qquad (1)$$

Accordingly, given an item of information, the parameter vector is used to route to the appropriate node. Like SVD, the parameter vector also includes elements sorted by decreasing importance.

In yet another embodiment, the parameter vector (or semantic vector) may applied to minimize the occurrence of hot spots. More specifically, during the process of a new node joining the peer search network, a random document that is to be published by the new node is selected. A parameter vector is created from the selected document. The new node is directed to the zone of the owner node where the parameter vector falls in the overlay network, which splits and gives part of its zone to the new node.

In yet another embodiment, multi-planing (also called rolling index) is used to reduce dimensionality while maintaining precision. In this embodiment, a single CAN network or other DHT network is used to partition more dimensions of the semantic space and to reduce the search region. More particularly, the lower elements of a parameter vector (or semantic vector) are partitioned into multiple low-dimensional subvectors on different planes, whereby one subvector is on each plane. A plane is an n-dimensional semantic space representation in the overlay network, such as the CAN network. A single overlay network can support multiple planes.

The dimensionality of the CAN network may be set equal to that of an individual plane. For example, a semantic vector vA for doc A is generated using LSI and includes multiple elements (or dimensions) v0, v1, v2, etc. Multiple two dimensional subvectors (e.g., v0–v1, v2–v3, etc.) are generated from vA. Each subvector is mapped on its own plane in the 2-dimensional CAN overlay network. Each of the subvectors is used as the DHT key for routing.

Each of the subvectors is associated with a respective address index, where selected subvectors may be associated with the same address index. When processing a query, the query is routed and flooded on each plane. Given a query, each plane independently returns matching documents to the query initiator, based on the subvectors of the plane. To retain as much as accuracy as possible, the full semantic vectors of the document and the query may be used to determine the similarity. However, partial semantic vectors may be used to determine similarities. The returned documents form a pre-selection set which is then forwarded to the query initiator. The query initiator then uses the full semantic vector to re-rank documents. In another multi-planing embodiment, elements of semantic vectors that correspond to the most important concepts in a certain document cluster are identified to form a plane (as opposed to using a continuous sub range of the lower elements of a semantic vector to generate subvectors). For example, clustering algorithms are applied to the semantic space to identify a cluster of semantic vectors that correspond to chemistry. A clustering algorithm that is based on a similarity matrix may include the following: (1) a document-to-document similarity function (e.g., the cosine measurement) that measures how closely two documents are related is first chosen; (2) an appropriate threshold is chosen and two documents with a similarity measure that exceeds the threshold are connected with an edge; and (3) the connected components of the resulting graph are the proposed clusters. Other known clustering algorithms may also be used. The cluster of identified semantic vectors are used to form planes. For example, elements from the cluster that are similar are identified, and subvectors are generated from the similar elements. Planes are formed from these subvectors.

In yet another multi-planing embodiment, continuous elements of a semantic vector that correspond to strong concepts in a particular document are identified to form planes. In this embodiment and the previous embodiment, not just the lower elements of a semantic vector are used to generate the searchable planes. Instead, high-dimensional elements that may include heavily weighted concepts are used to generate planes that can be searched. For example, continuous elements in the semantic vector that are associated with concepts in the item of information are identified. Subvectors are formed from the continuous elements. Planes are created from the subvectors. The planes are represented in indices including key pairs that may be searched in response to a chemistry-related query. Any of the multi-planing embodiments may use semantic vectors or parameter vectors.

In yet another embodiment, global characteristics may be updated using samples. More particularly, the peer search network may require global characteristics, e.g., a dictionary, an inverse document frequency scheme, a basis for the semantic information space, etc., in order to efficiently operate. The global characteristics are pre-computed and then associated with the appropriate nodes in the peer search network. Updates to the global characteristics are performed by sending samples. For example, the basis may be updated by forwarding the changes to the basis since the last update. Consequently, when the basis does shift, the semantic vector of a document also changes. This may require redistribution of the index when the difference between two consecutive versions of a semantic vector is significant that the old semantic vector and new semantic vector no longer reside on the same zone. FIG. 1 illustrates a logical diagram of an embodiment. As shown in FIG. 1, the overlay network 100 of a peer search network may be represented as a two-dimensional Cartesian space, i.e., a grid. It should be readily apparent to those skilled in the art that other dimensions and other spaces may be used. Each zone of the overlay network 100 includes a peer that owns the zone. For example, in FIG. 1, the black circles represent the owner nodes for their respective zones. The overlay network may be a CAN or other DHT network.

In an embodiment, information may be stored in the overlay network 100 as key pairs. Each key pair may comprise of a semantic vector and an address index. The semantic vector may be the mapping of semantic information space, L, into the logical space, K, of the overlay network 100. The dimensionality of the semantic information space and the logical space of the overlay network 100 may be represented as l and k, respectively. Since L and K are freely tunable, mapping a document represented in the semantic information space, L, to a point in the logical space, K, may be accomplished by setting the dimensionality of the two spaces equal, i.e., L=K. Accordingly, the semantic vector of an item of information indicates a location in the overlay network 100.

The key pair may then be stored in the node owner of the zone where the location falls in the overlay network 100. For example, FIG. 1 shows the key pair (i.e., s(DOC A), Y) for document A (i.e., DOC A). The semantic vector component, s(DOC A), of the key pair may be computed by applying a latent semantic indexing (LSI) algorithm to DOC A. A hash function is applied to the semantic vector s(DOC A) to identify a point in the overlay network for storing the key pair.

As shown in FIG. 1, the key pair of DOC A, (s(DOC A), Y) may be routed to a point in the overlay network 100 (in this case peer search node 110) for storage. The aggregation of key pairs at peer search nodes may then form indices of semantically similar information that is searchable. Therefore, instead of storing information randomly in a peer-to-peer network, such as performed in a conventional CAN, information is placed in a controlled fashion to facilitate and improve querying by aggregating similar key pairs on a peer search node or in nearby neighboring nodes.

When a query is received, the LSI algorithm may be applied to the query and normalized to form a semantic query vector, s(QUERY). The semantic query vector may then be routed to a selected node, e.g., peer search node 115, based on the semantic query vector falling in the zone owned by the peer search node 115. The peer search node 115 may search its indices for any key pairs that match the semantic query vector. The peer search may then retrieve, filter, and forward the requested information to the initiator of the query.

The peer search node 115 may also select a group of neighboring nodes based on the neighboring nodes falling with a radius (represented as 120 in FIG. 1) of the peer search node 115. The peer search node 115 may then forward the semantic query vector to the selected group for information retrieval. Since information is aggregated within a node or in nearby neighboring node, information may be retrieved without expending excessive network resources.

In another embodiment, a parameter vector along with an address index may form key pairs to be stored in the overlay network 100 to improve load balancing. More particularly, the formation of semantic vector involves normalization, which then resides on a unit sphere in the semantic information space, L. However, the normalization may lead to an unbalanced consolidation of key pairs. Accordingly, a transformation of equation (1) is applied the semantic vector to form the parameter vector, which maps the semantic vector into a (l-1) dimensional polar subspace, P. The parameter vector is then used to publish information and to query information similar to the use of the semantic vector.

In yet another embodiment, the parameter vector (or semantic vector) may be utilized to even the distribution of the key pairs. More specifically, a semantic vector or parameter vector is generated for information to be published in the overlay network 100. The semantic vector or parameter vector is used as a key to identify a node in the overlay network 100 for storing the information. When a new node joins the overlay network 100, an item of information may be randomly selected from the publishable contents of the new node. The LSI algorithm may be applied to the item of information to form the semantic vector. Subsequently, the semantic vector is transformed into a respective parameter vector. The new node then joins by splitting and taking over part of the zone of where parameter vector (or semantic vector) falls in the overlay network 100. This results in a node distribution being similar to the document distribution.

Figure 2:
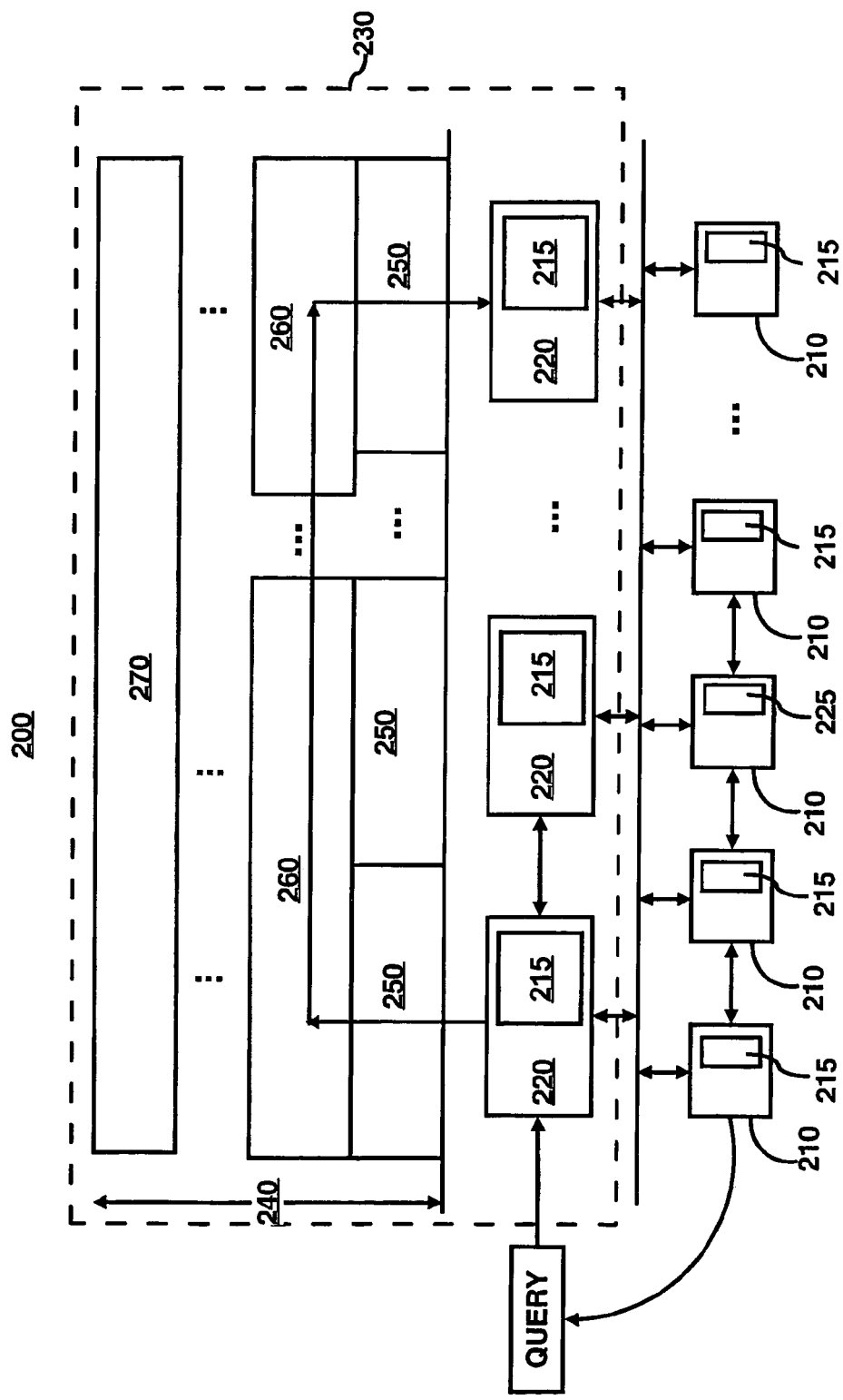
FIG. 2 illustrates a logical perspective another embodiment.

FIG. 2 illustrates an exemplary schematic diagram of an embodiment 200. As shown in FIG. 2, peers (or nodes) 210 may form a peer-to-peer network. Each peer of peers 210 may store and/or produce information (e.g., documents, data, web pages, etc.). The items of information may be stored in a dedicated storage device (e.g., mass storage) 215 accessible by the respective peer. The peers 210 may be computing platforms (e.g., personal digital assistants, laptop computers, workstations, and other similar devices) that have a network interface.

The peers 210 may be configured to exchange information among themselves and with other network nodes over a network (not shown). The network may be configured to provide a communication channel among the peers 210. The network may be implemented as a local area network, wide area network or combination thereof. The network may implement wired protocols such as Ethernet, token ring, etc., wireless protocols such as Cellular Digital Packet Data, Mobitex, IEEE 801.11b, Wireless Application Protocol, Global System for Mobiles, etc., or combination thereof.

A subset of the peers 210 may be selected as peer search nodes 220 to form a peer search network 230. The peer search network 230 may be a mechanism to permit controlled placement of key pairs within the peer search peers 220. In the peer search network 230, an item of information may be represented as indices comprised of key pairs. A key pair may comprise a semantic (or parameter) vector of an item of information and an address index of the item of information. The peers 210 may be configured to publish the key pairs to respective nodes where the semantic vector falls within their zones. Accordingly, the peer search network 230 may then self-organize the key pairs based on the semantic vector of the key pair.

When a query is received, a vector representation of the query may be formulated. For example, the LSI algorithm may be applied to the query to form the semantic query vector. The semantic query vector is then routed in the peer search network 230 to locate the requested information. Subsequently, after reaching the destination node indicated by the semantic query vector, the semantic query vector is then forwarded to neighboring nodes within a radius, r, of the destination node. Each of the neighboring nodes, including the destination node, may retrieve any information matching the semantic query vector, filter the retrieved information to form a preselected set of information and forward the preselected information to the query initiator.

In another embodiment, the lower elements of a parameter vector are partitioned into multiple low-dimensional subvectors. Each of the subvectors are then associated with a respective address index, where selected subvectors may be associated with the same address index. Thus, forming a plurality of planes in the peer search network 230.

When processing a query, the query is also routed and flooded on each plane. Given a query, each plane independently returns matching documents to the query initiator, based on the subvectors of the plane. The returned documents form a pre-selection set which is then forwarded to the query initiator. The query initiator then uses the full semantic vector to re-rank documents.

In another embodiment, the peer search network 230 may be configured to include an auxiliary overlay network 240 for routing. A logical space formed by the peer search network 230 may be a d-torus, where d is the dimension of the logical space. The logical space is divided into fundamental (or basic) zones 250 where each node of the subset is the peers is an owner. Additional zones 260, 270 are formed over the fundamental zones to provide expressway routing of key pairs and queries.

Figure 3:
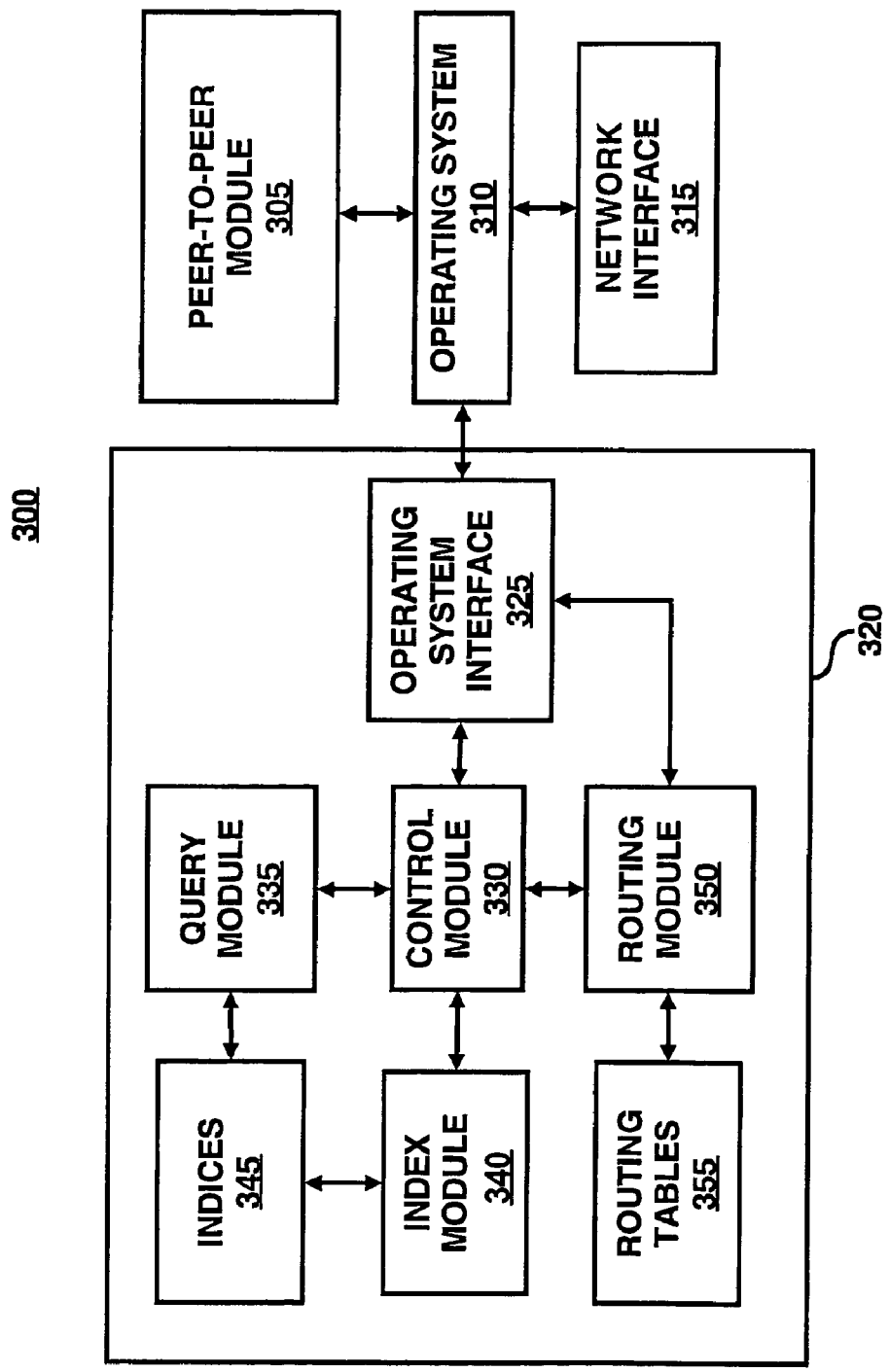
FIG. 3 illustrates an exemplary architecture for the peer search node in accordance with yet another embodiment.

FIG. 3 illustrates an exemplary architecture 300 for the peer search peer 220 shown in FIG. 2 in accordance with an embodiment. It should be readily apparent to those of ordinary skill in the art that the architecture 300 depicted in FIG. 3 represents a generalized schematic illustration and that other components may be added or existing components may be removed or modified. Moreover, the architecture 300 may be implemented using software components, hardware components, or a combination thereof.

As shown in FIG. 3, the architecture 300 may include a peer-to-peer module 305, an operating system 310, a network interface 315, and a peer search module 320. The peer-to-peer module 305 may be configured to provide the capability to a user of a peer to share information with another peer, i.e., each peer may initiate a communication session with another peer. The peer-to-peer module 305 may be a commercial off-the-shelf application program, a customized software application or other similar computer program. Such programs such as KAZAA, NAPSTER, MORPHEUS, or other similar P2P applications may implement the peer-to-peer module 305.

The peer search module 320 may be configured to monitor an interface between the peer-to-peer module 305 and the operating system 315 through an operating system interface 325. The operating system interface 310 may be implemented as an application program interface, a function call or other similar interfacing technique. Although the operating system interface 325 is shown to be incorporated within the peer search module 320, it should be readily apparent to those skilled in the art that the operating system interface 325 may also incorporated elsewhere within the architecture of the peer search module 320.

The operating system 310 may be configured to manage the software applications, data and respective hardware components (e.g., displays, disk drives, etc.) of a peer. The operating system 310 may be implemented by the MICROSOFT WINDOWS family of operating systems, UNIX, HEWLETT-PACKARD HP-UX, LINUX, RIM OS, and other similar operating systems.

The operating system 310 may be further configured to couple with the network interface 315 through a device driver (not shown). The network interface 315 may be configured to provide a communication port for the respective peer over a network. The network interface 315 may be implemented using a network interface card, a wireless interface card or other similar input/output device.

The peer search module 320 may also include a control module 330, a query module 335, an index module 340, at least one index (shown as 'indices' in FIG. 3) 345, and a routing module 350. As previously noted, the peer search module 320 may be configured to implement the peer search network for the controlled placement and querying of key pairs in order to facilitate searching for information. The peer search module 320 may be implemented as a software program, a utility, a subroutine, or other similar programming entity. In this respect, the peer search module 320 may be implemented using software languages such as C, C++, JAVA, etc. Alternatively, the peer search module 320 may be implemented as an electronic device utilizing an application specific integrated circuit, discrete components, solid-state components or combination thereof.

The control module 330 of the peer search module 320 may provide a control loop for the functions of the peer search network. For example, if the control module 330 determines that a query message has been received, the control module 330 may forward the query message to the query module 335.

The query module 335 may be configured to provide a mechanism to respond to queries from peers (e.g., peers 110) or other peer search nodes (e.g., 120). As discussed above and in further detail with respect to FIG. 5, the query module 335 may respond to a query for information be determining whether the received query is a parent query or a child query. The child query may the query that is forwarded to the nodes with a radius, r, that neighbor a receiving node. If the received query is a parent query, the query is forwarded to the neighboring nodes within the radius r. Otherwise, the query module 335 may be configured to search the indices 345 for any matching key pairs. If there are matching key pairs, the query module 335 may retrieve the indexed information as pointed by the address index in the matching key pair. The query module 335 may then rank the retrieved information by applying LSI techniques to form a ranked (or filtered) preselected set of information. The preselected set of information is then forwarded to the initiator of the query. If there are no matching key pairs, the query module 335 may hibernate till the next query is received.

The indices module 345 may contain a database of similar key pairs as an index. There may be a plurality of indices associated with each peer search node. In one embodiment, a peer search node may be assigned multiple terms, thus the indices module 345 may contain a respective index for each term. The indices module 345 may be maintained as a linked-list, a look-up table, a hash table, database or other searchable data structure.

The index module 340 may be configured to create and maintain the indices 345. In one embodiment, the index module 340 may receive key pairs published by peers (e.g., peers 100 in FIG. 1). In another embodiment, the index module 340 may actively retrieve, i.e., 'pull', information from the peers. The index module 340 may also apply the vector algorithms to the retrieved information and form the key pairs for storage in the indices 345.

The control module 330 may also be interfaced with the routing module 350. The routing module 350 may be configured to provide expressway routing for semantic query vectors and key pairs. Further detail of the operation of the routing module 350 is described with respect to FIG. 6.

Figure 4:
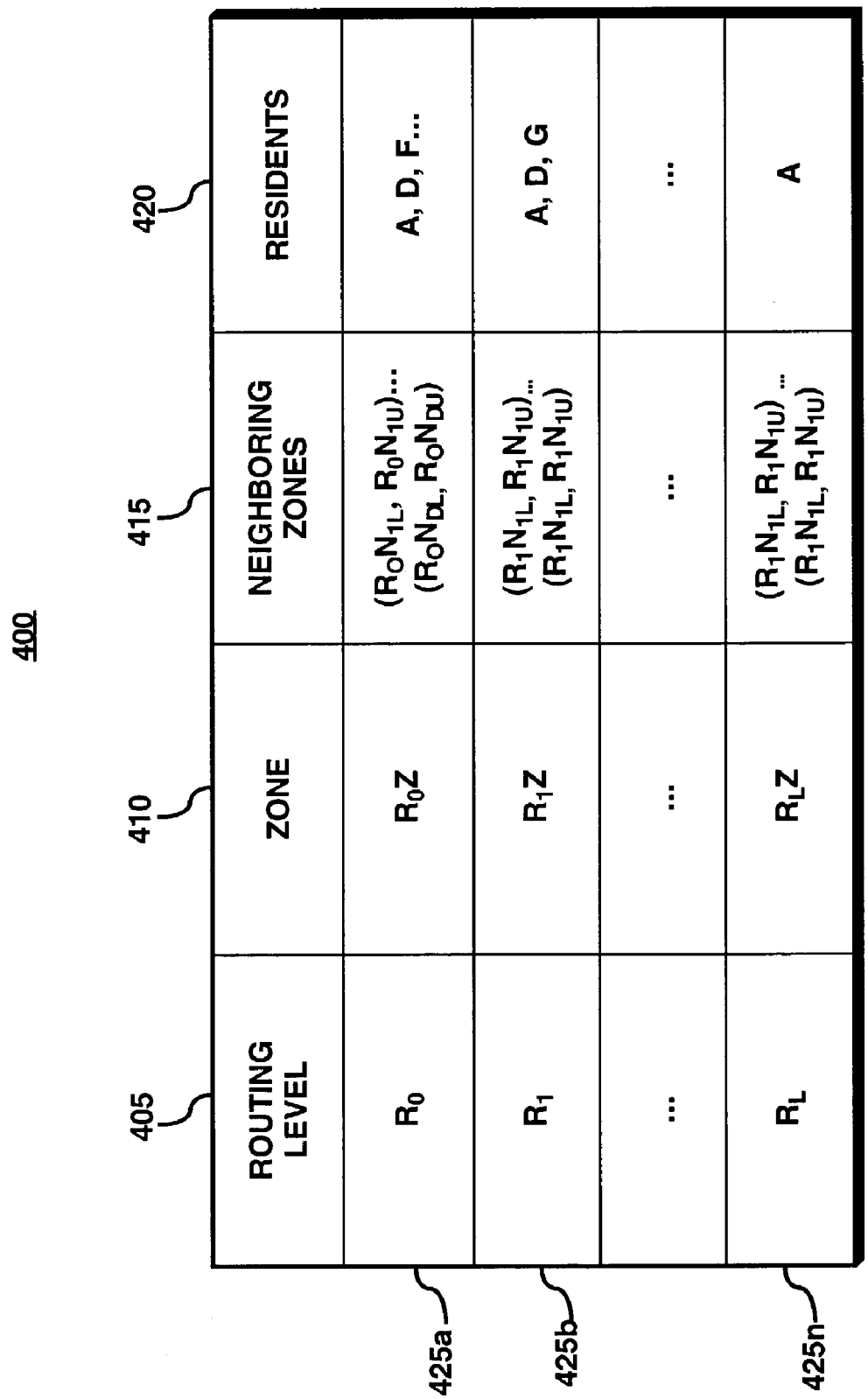
FIG. 4 illustrates an exemplary routing table for the peer search node in accordance with yet another embodiment.

The routing module 350 may access routing table 355 to implement expressway routing. FIG. 4 illustrates an exemplary diagram of the routing table 355 in accordance with an embodiment. It should be readily apparent to those of ordinary skill in the art that the routing table 355 depicted in FIG. 4 represents a generalized illustration and that other fields may be added or existing fields may be removed or modified.

As shown in FIG. 4, the routing table 355 may include a routing level field 405, a zone field 410, a neighboring zones field 415, and a resident field 420. In one embodiment, the values in the routing level field 405, the zone field 410, the neighboring zones 415, and the resident field 420 are associated or linked together in each entry of the entries 425a . . . n.

A value in the routing level field 405 may indicate the span the between zone representatives. The range of values for the level of the zone may range from the current unit of the overlay network ($R_L$) to the entire logical space of the P2P system ($R_0$). The largest value in the routing level field 405 may indicate the depth of the routing table as well as being the current table entry.

A value in the zone field 410 may indicate which zones the associated peer is aware thereof. Values in the neighboring zones field 415 indicate the identified neighbor zones to the peer. A neighbor zone may be determined by whether a zone shares a common border in the coordinate space; i.e., in a d-dimensional coordinate space, two nodes are neighbors if their coordinate spans overlap along d-1 dimensions and abut along one dimension.

Values in the resident fields 420 may indicate the identities of residents for the neighboring zones stored in the neighboring zones field 415. The values in residents field 420 may be indexed to the values the neighboring zones field 415 to associate the appropriate resident in the proper neighboring zone.

Figure 5:
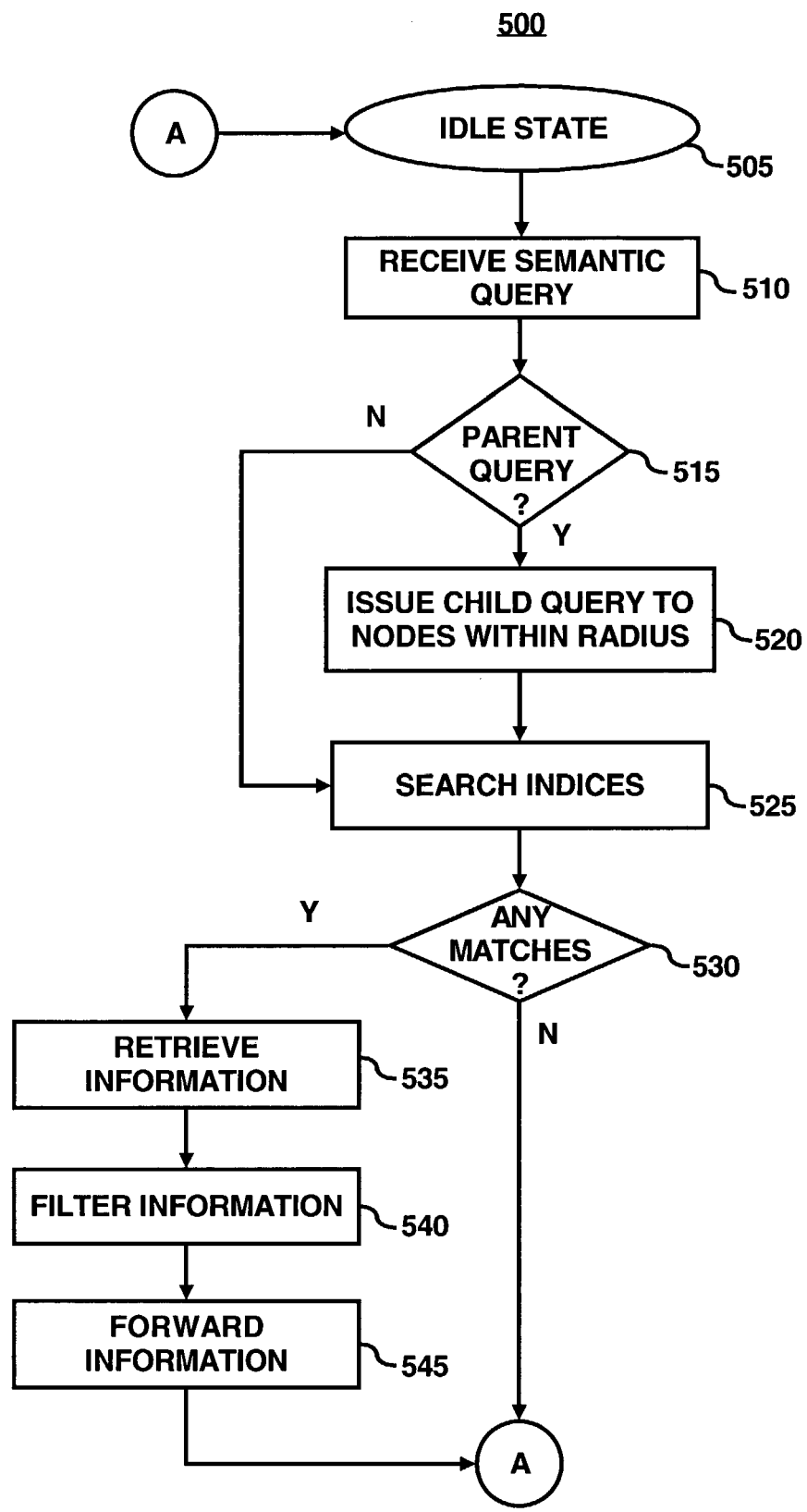
FIG. 5 illustrates an exemplary flow diagram for the query module of the peer search module shown in FIG. 3 in accordance to yet another embodiment.

FIG. 5 illustrates an exemplary flow diagram 500 for the query module 335 (shown in FIG. 3) according to an embodiment. It should be readily apparent to those of ordinary skill in the art that this method 500 represents a generalized illustration and that other steps may be added or existing steps may be removed or modified.

As shown in FIG. 5, the query module 335 may be in an idle state, in step 505. The control module 330 may invoke a function call to the query module 335 based on detecting a query froni the operating system interface 325.

In step 510, the query module 335 may receive the semantic (or parameter) query vector. The semantic query vector may be stored in a temporary memory location for processing.

In step 515, the query module 335 may determine whether the received semantic query vector is a parent query. If the query module 335 determines that the received semantic query vector is not a parent query, i.e., a child query, the query module 335 may proceed to the processing of step 525, which is discussed below. Otherwise, if the query module 335 determines that the received semantic query vector is a parent query, the query module 335 may forward, in step 520, the received semantic query vector to the nodes that are within a radius, r. The radius, r, may be a user-specified characteristic, a network tunable characteristic, or combination thereof. The query module 335 may also mark or set a flag in the forwarded semantic query vector to indicate its status as a child query.

In step 525, the query module 335 may search may search the indices 345 with the received query as a search term, in step 525. If the query module 335 determines that there are no matching key pairs in the indices 345, in step 530, the query module 335 may return to the idle state of step 505.

Otherwise, if the query module 335 determines there are matching key pairs, in step 530, the query module 335 may retrieve the information as pointed by the respective address index of the matching key pairs, and store the matching information in a temporary storage area, in step 535. The query module 335 may then rank the matching information by applying LSI algorithms to form a preselected set of information, in step 540. The query module 335 may forward the ranked set of matching key pairs to the initiator of the query, in step 545. Subsequently, the query module 335 may return to the idle state of step 505.

Figure 6:
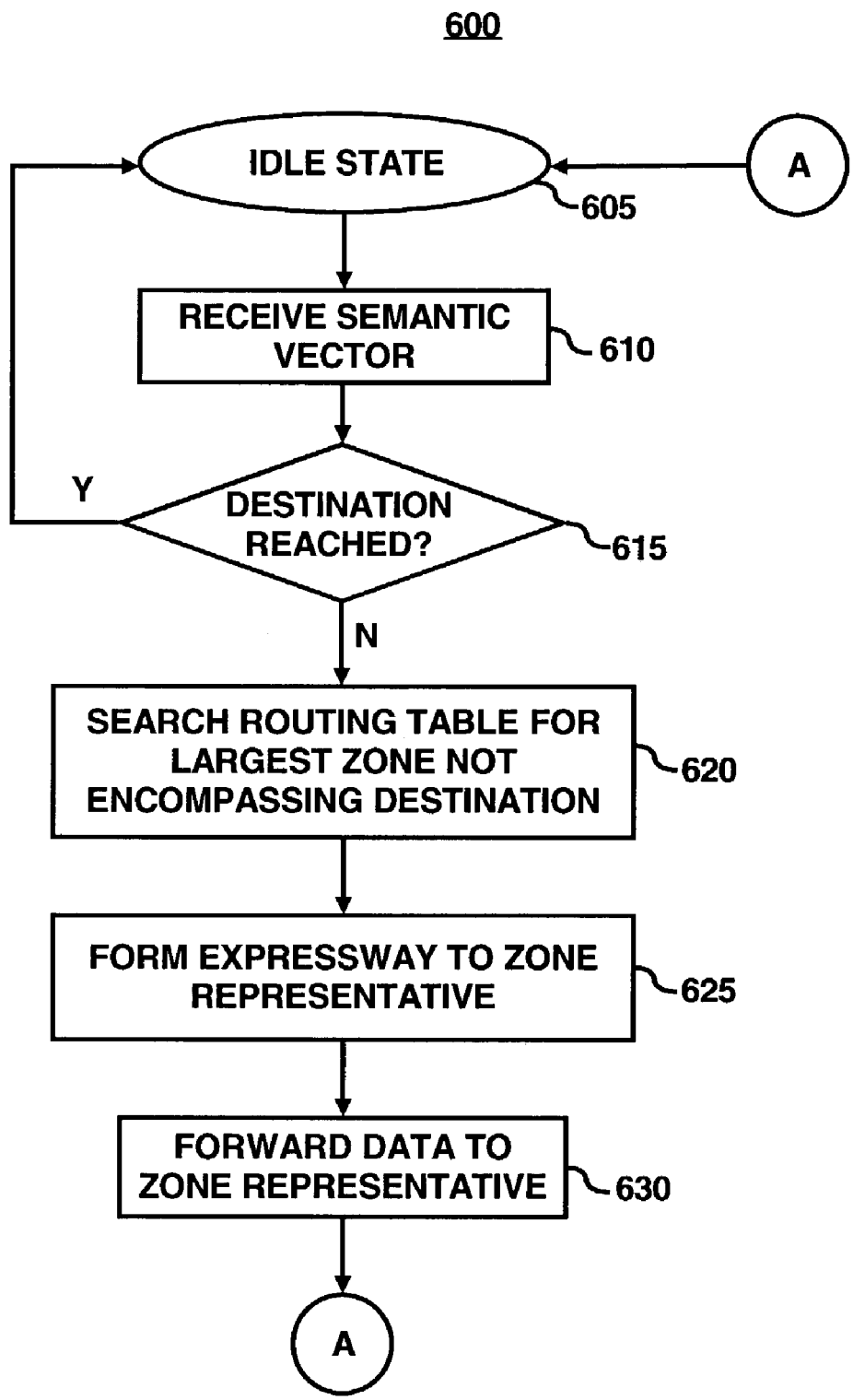
FIG. 6 illustrates an exemplary flow diagram for the routing module of the peer search module shown in FIG. 3 in accordance with yet another embodiment.

FIG. 6 illustrates an exemplary flow diagram for a method 600 of the routing module 350 shown in FIG. 3 in accordance with another embodiment. It should be readily apparent to those of ordinary skill in the art that this method 600 represents a generalized illustration and that other steps may be added or existing steps may be removed or modified.

As shown in FIG. 6, the routing module 350 of the peer search module 230 may be configured to be in an idle state in step 605. The routing module 350 may monitor the network interface 315 via the operating system 310 (shown in FIG. 3) for any received requests to route data. The requests may be initiated by a user of a peer or the requests may be forwarded to the receiving peer functioning as an intermediate peer. Alternatively, the requests to route may be received from the query module 335 as described above with respect to FIG. 6.

In step 610, the routing module 350 may received the semantic (or parameter) vector. In step 615, the routing module 350 determines whether the request has reached its destination. If the destination is the receiving peer, the routing module 350 may return to the idle state of step 605.

Otherwise, in step 620, the routing module 350 may be configured to search the routing table 355 for a largest zone not encompassing the semantic vector. It should be noted that the largest zone that does not encompass the destination can always be found, given the way the zones are determined as described above.

In step 625, the routing module 350 may be configured to form a communication channel, i.e., an expressway, to the zone representative of the destination zone at the level of the largest zone. The routing module 350 may forward the requested data to the zone representative in the destination zone in step 630. The zone representative will then forward the data to the destination peer. Subsequently, the routing module 350 may return to the idle state of step 605.

Figure 7:
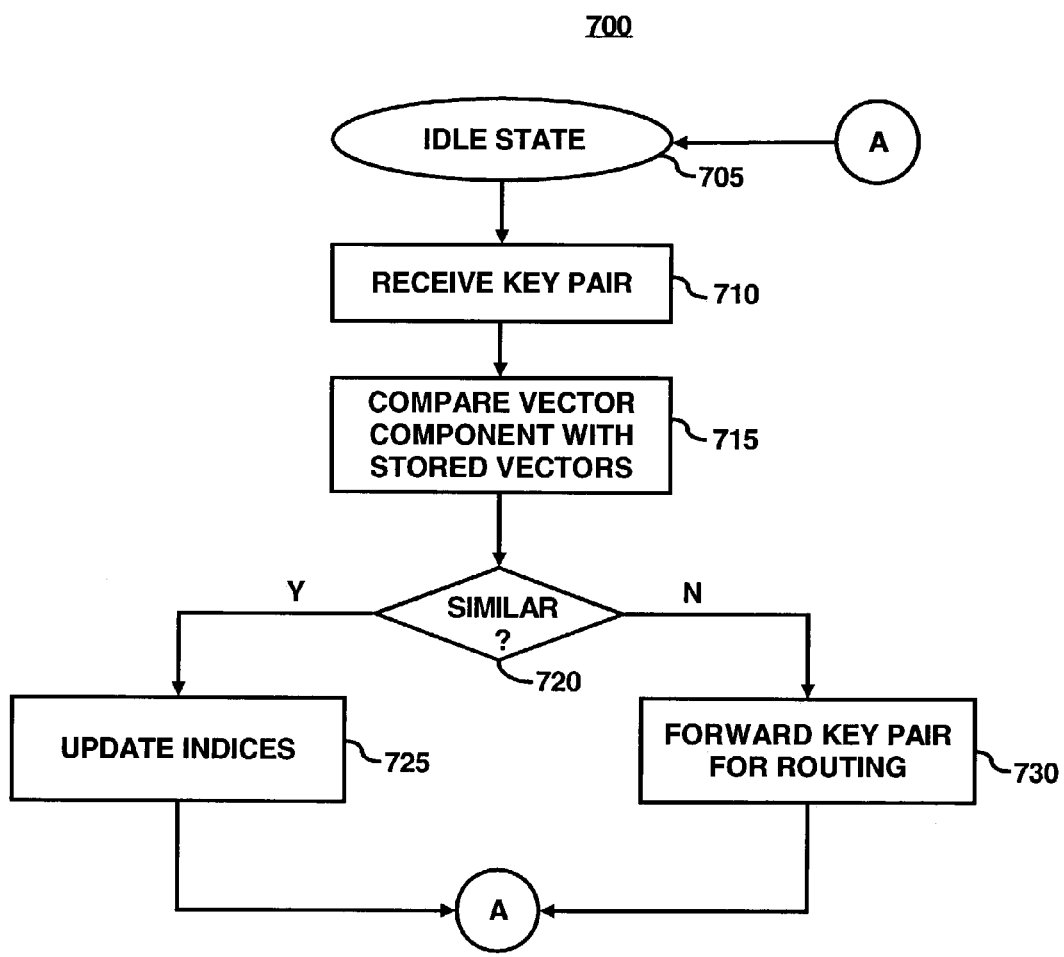
FIG. 7 illustrates an exemplary flow diagram for the index module of the peer search module shown in FIG. 3 in accordance with yet another embodiment.

FIG. 7 illustrates an exemplary embodiment of a method 700 of the index module 340 shown in FIG. 3 in accordance with an embodiment. It should be readily apparent to those of ordinary skill in the art that this method 700 represents a generalized illustration and that other steps may be added or existing steps may be removed or modified.

As shown in FIG. 7, the index module 340 may be in an idle state, in step 705. The control module 330 may detect the receipt of a key pair through the network interface 315 through the operating system interface 325. The control module 330 may be configured to forward or invoke the index module 340.

In step 710, the index module 340 may be configured to receive the key pair. The index module 340 may store the key pair in a temporary memory location. In step 715, the vector component of the key pair is extracted.

In step 720, the index module 340 may compare the vector component for similarity to the vectors currently stored in the indices 345. In one embodiment, a cosine between the component vector and a selected vector of the stored vectors is determined. The cosine is then compared to a user-specified threshold. If the cosine exceeds the user-threshold, the two vectors are determined to be dissimilar.

If the key pair is similar to the key pairs stored in the indices, the index module 340 may update the indices with the received key pair, in step 725. Subsequently, the index module 340 may return to the idle state of step 705. Otherwise, the index module 340 may forward the received key pair to the routing module 350 for routing, in step 730. Subsequently, the index module 340 may return to the idle state of step 705.

Figure 8:
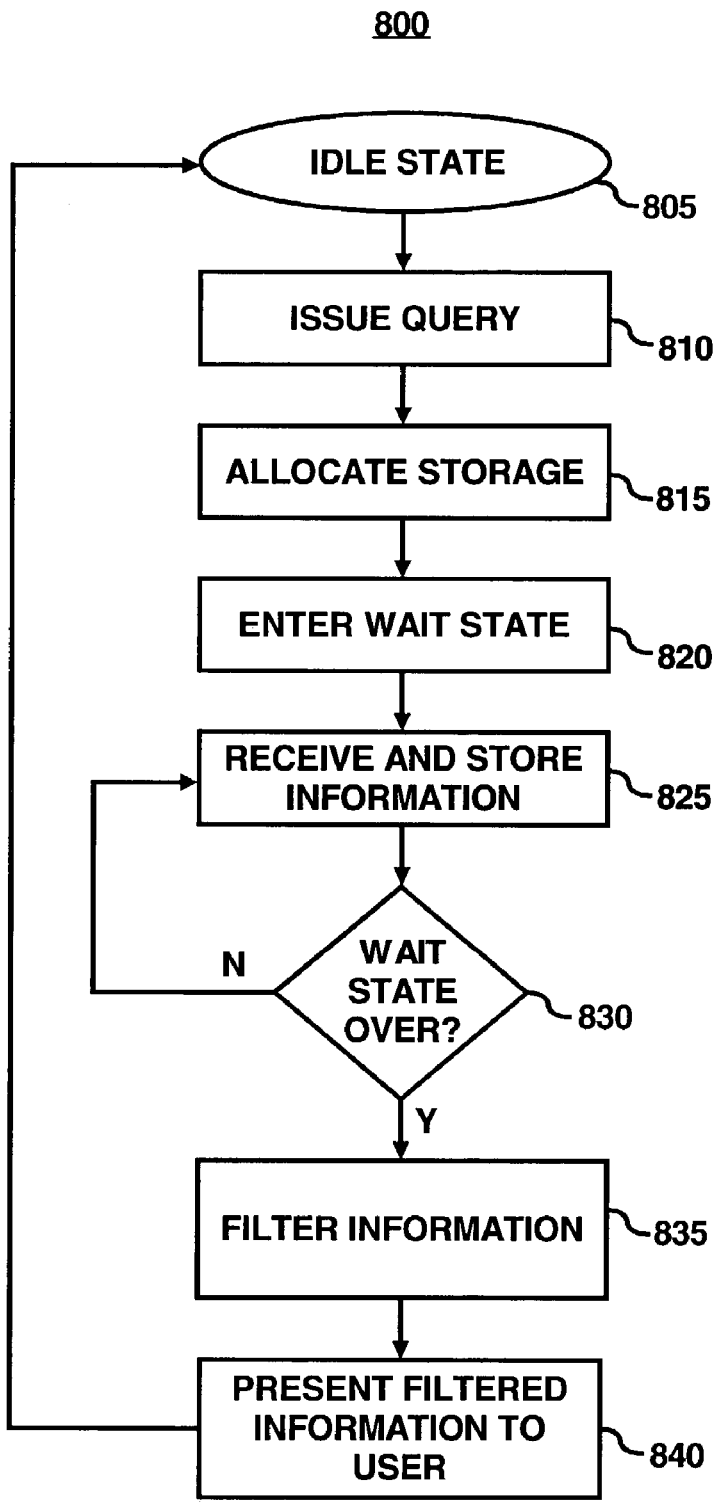
FIG. 8 illustrates an exemplary flow diagram for the query module of the peer search module shown in FIG. 3 in accordance with yet another embodiment.

FIG. 8 illustrates an exemplary flow diagram for a method 800 of the query module 335 as a query initiator module in accordance with an embodiment. It should be readily apparent to those of ordinary skill in the art that this method 800 represents a generalized illustration and that other steps may be added or existing steps may be removed or modified.

As shown in FIG. 8, the query module 335 may be in an idle state in step 805. The query module 335 may receive a request for a query through the operating system interface 325. The query module 335 may convert the received query into a semantic (or parameter) query vector, in step 810.

The query module 335 may also be configured to allocate temporary storage space for the retrieved information, in step 815. The query module 335 may enter a wait state to wait for the information to be gathered in step 820. The wait state may be implemented using a timer or user event-driven programming.

During the wait state, in step 825, information from the query may be stored in the allocated temporary storage location. The query module 335 may be configured to determine whether the wait state has finished, in step 830. If the wait state has not completed, the query module 335 returns to step 825.

Otherwise, if the wait state has completed, the query module 335 may be configured to apply LSI techniques to filter the received items of information to rank the most relevant, in step 835. In step 840, the query module 335 may then provide the filtered items of information to the user. Subsequently, the query module 335 may return to the idle sate of step 805.

Figure 9:
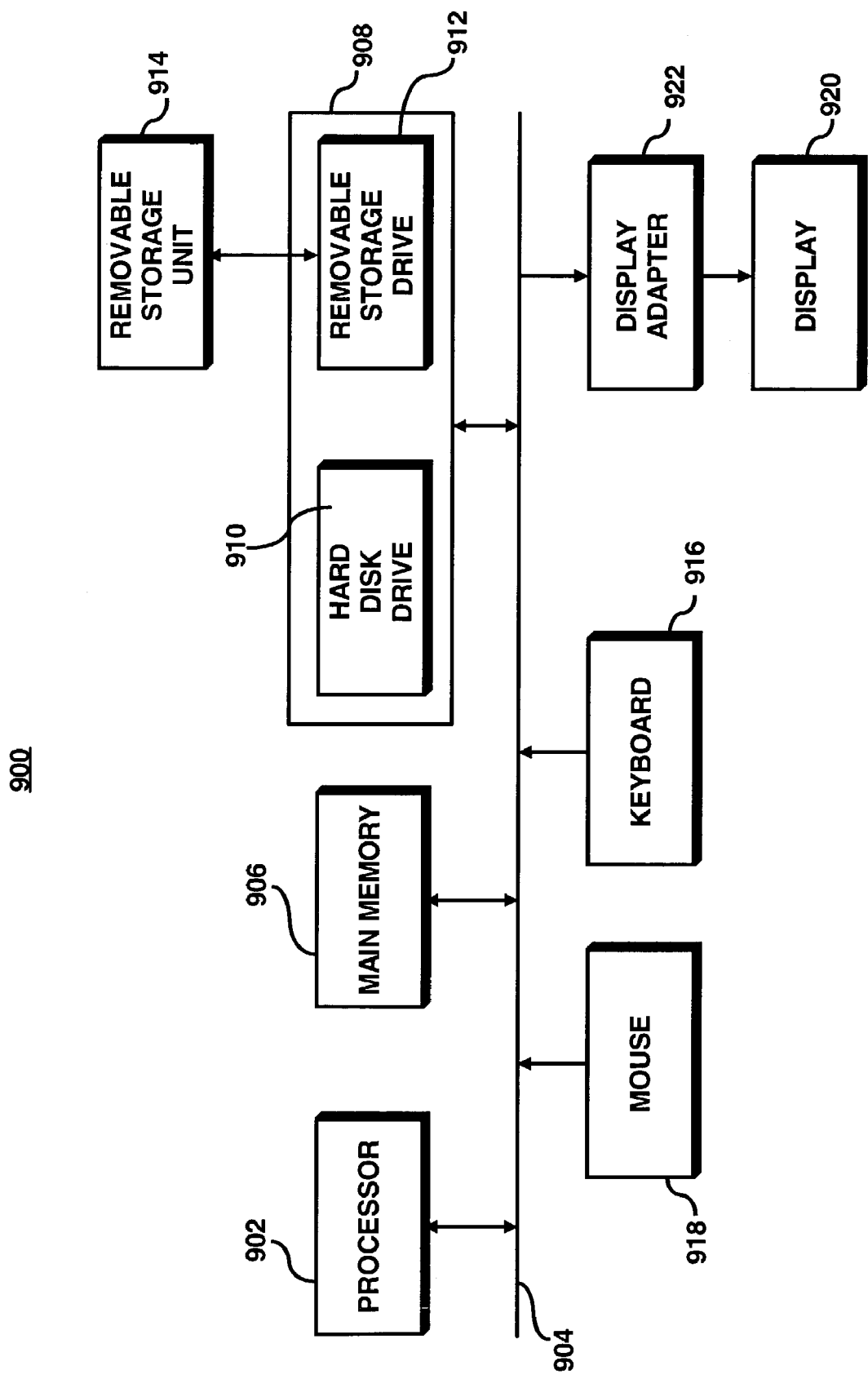
FIG. 9 illustrates a computer system where an embodiment may be practiced.

FIG. 9 illustrates an exemplary block diagram of a computer system 900 where an embodiment may be practiced. The functions of the range query module may be implemented in program code and executed by the computer system 900. The expressway routing module may be implemented in computer languages such as PASCAL, C, C++, JAVA, etc.

As shown in FIG. 9, the computer system 900 includes one or more processors, such as processor 902, that provide an execution platform for embodiments of the expressway routing module. Commands and data from the processor 902 are communicated over a communication bus 904. The computer system 900 also includes a main memory 906, such as a Random Access Memory (RAM), where the software for the range query module may be executed during runtime, and a secondary memory 908. The secondary memory 908 includes, for example, a hard disk drive 910 and/or a removable storage drive 912, representing a floppy diskette drive, a magnetic tape drive, a compact disk drive, etc., where a copy of a computer program embodiment for the range query module may be stored. The removable storage drive 912 reads from and/or writes to a removable storage unit 914 in a well-known manner. A user interfaces with the expressway routing module with a keyboard 916, a mouse 918, and a display 920. The display adaptor 922 interfaces with the communication bus 904 and the display 920 and receives display data from the processor 902 and converts the display data into display commands for the display 920.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method for semantic querying of a peer-to-peer network, said method comprising:
    mapping an item of information into a semantic vector based on a latent semantic indexing algorithm;
    associating said semantic vector with an address index as a key pair; and
    storing said key pair in an overlay network formed from said peer-to-peer network such that the stored key pair is proximally located to at least one other key pair having a similar semantic vector.

2. The method according to claim 1, further comprising:
    forming a plurality of indices; and
    associating each index of said plurality with a respective peer of said peer-to-peer network, each index formed by storing key pairs at said respective peer.

3. The method according to claim 2, further comprising:
    receiving a query for requested information; and
    converting said query to a semantic query vector based on said latent semantic indexing algorithm.

4. The method according to claim 3, further comprising:
    routing said semantic query vector to a selected node based on a location of where said semantic query vector falls within said overlay network.

5. The method according to claim 4, further comprising:
    flooding said semantic query vector to a plurality of peers of said peer-to-peer network, said plurality of peers within a radius of said selected node.

6. The method according to claim 5, further comprising:
    retrieving preselected sets of information, each candidate set of information filtered by each respective peer of said plurality of peers; and
    forwarding said preselected sets of information to an initiator of said query.

7. The method according to claim 6, further comprising:
    receiving said preselected sets of information; and
    applying said latent semantic indexing algorithm to said preselected sets of information to form a candidate set of information.

8. The method according to 1, further comprising:
    converting said semantic vector to a parameter vector based on a transformation.

9. The method according to claim 8, further comprising:
    parsing at least one of said parameter vector and said semantic vector into a plurality of subvectors.

10. The method according to claim 9, further comprising:
    creating a plurality of planes in said overlay network, wherein each plane is associated with a respective subvector and associated address index.

11. The method according to claim 10, further comprising:
    receiving a query; and
    converting said query into a query parameter vector.

12. The method according to claim 11, further comprising:
    routing said query-parameter vector to a selected node based on a location of where said query-parameter vector falls within said overlay network.

13. The method according to claim 11, further comprising:
    parsing said query-parameter vector into a plurality of query subvectors; and
    routing said plurality of query subvectors among said plurality of planes.

14. The method of claim 1, further comprising:
parsing at least one of the semantic vector or a parameter vector generated from the semantic vector into a plurality of subvectors; and
creating a plurality of planes in the overlay network from the plurality of subvectors.

15. The method of claim 14, wherein parsing at least one of the semantic vector or a parameter vector generated from the semantic vector into a plurality of subvectors comprises:
applying clustering algorithms to semantic vectors or parameter vectors in the overlay network to identify related vectors;
identifying elements from the related vectors that are similar; and
generating the plurality of subvectors from the similar elements.

16. The method of claim 14, wherein parsing at least one of the semantic vector or a parameter vector generated from the semantic vector into a plurality of subvectors comprises:
identifying continuous elements in the semantic vector or parameter vector that are associated with concepts in the item of information; and
generating the plurality of subvectors from the continuous elements.

17. The method of claim 14, further comprising searching the plurality of planes in response to receiving a query.

18. The method of claim 1, further comprising substantially evenly distributing key pairs in the overlay network by using parameter vectors generated from semantic vectors to determine locations for storing the key pairs in the overlay network.

19. The method of claim 1, further comprising:
identifying a new node joining the overlay network;
determining a parameter vector for an item of information associated with the new node; and
assigning the new node to a zone where the parameter vector falls in the overlay network.

20. An apparatus for semantic querying in a peer-to-peer network, said apparatus comprising:
means for creating a plurality of indices, each index of said plurality of indices comprising a plurality of key pairs, each key pair comprising a respective semantic vector and an associated address index; and
means for associating a selected index of said plurality to a selected peer based on a location of where said respective semantic vectors of said key pairs of said selected index falls within an overlay network.

21. The apparatus according to claim 20, further comprising:
means for receiving a query; and
means for converting said query into a semantic query vector.

22. The apparatus according to claim 21, further comprising:
means for routing said semantic query vector to a selected node based on a location of where said semantic query vector falls within said overlay network, wherein said location is owned by said selected node.

23. The apparatus according to claim 22, further comprising:
means for routing said semantic query vector to a plurality of peers of said peer-to-peer network based on said plurality of peers being within a radius of said selected node.

24. A system for querying a peer-to-peer network, said system comprising:
a plurality of peers;
an overlay network implemented by said plurality of peers, wherein said overlay network is configured to be divided into zones, each zone owned by a respective peer of said plurality of peers;
a plurality of indices, each index of said plurality of indices based on at least one key pair comprising of a respective parameter vector and associated address index, wherein said parameter vector is based on a transformation of a respective semantic vector; and
a query module stored an executed by each peer of said plurality of peers, wherein said query module is configured to convert a query into a query parameter vector and receive requested information from a respective index stored a selected peer that owns the respective zone where said query parameter vector falls within said overlay network.

25. The system according to claim 24, wherein said query module is further configured to receive said query parameter vector and to parse said query parameter vector into a plurality of query subvectors.

26. The system according to claim 25, wherein said overlay network comprises a plurality of planes, each plane associated with a respective subvector and wherein said query module is further configured to route said query parameter vector to a plurality of peers within a radius and to route said plurality of query subvectors among said plurality of planes.

27. The system according to claim 26, wherein said query module is further configured to collect a set of information based on said query parameter vector and said plurality of query subvectors and provide said set of information.

28. The system according to claim 24, further comprising an index module configured to instantiate and maintain said plurality of indices.

29. The system according to claim 28, further comprising an indices module configured to store said plurality of indices and adapted to interface with said index module.

30. The system according to claim 24, further comprising a routing module configured to route said query parameter vector through said overlay network.

31. The system according to claim 30, wherein said routing module is further configured to select a zone for a new node to join said overlay document based on selecting a document stored on said new node, converting said document into a respective parameter vector and locating a host node of where said respective parameter vector falls within said overlay network.

* * * * *